US009760150B2

(12) United States Patent
Ahmad et al.

(10) Patent No.: US 9,760,150 B2
(45) Date of Patent: Sep. 12, 2017

(54) LOW-POWER STATES FOR A COMPUTER SYSTEM WITH INTEGRATED BASEBAND

(71) Applicant: NVIDIA Corporation, Santa Clara, CA (US)

(72) Inventors: Sagheer Ahmad, Cupertino, CA (US); Pete Cumming, Wickwar (GB); Brad Simeral, San Francisco, CA (US); Matthew Longnecker, San Jose, CA (US); Sudeshna Guha, Bangalore (IN)

(73) Assignee: NVIDIA Corporation, Santa Clara, CA (US)

( * ) Notice: Subject to any disclaimer, the term of this patent is extended or adjusted under 35 U.S.C. 154(b) by 336 days.

(21) Appl. No.: 13/686,651

(22) Filed: Nov. 27, 2012

(65) Prior Publication Data
US 2014/0149770 A1    May 29, 2014

(51) Int. Cl.
*G06F 1/32*    (2006.01)

(52) U.S. Cl.
CPC ............ *G06F 1/3228* (2013.01); *G06F 1/324* (2013.01); *G06F 1/3275* (2013.01); *G06F 1/3287* (2013.01); *Y02B 60/1217* (2013.01); *Y02B 60/1225* (2013.01); *Y02B 60/1228* (2013.01); *Y02B 60/1282* (2013.01); *Y02B 60/32* (2013.01)

(58) Field of Classification Search
CPC .................................................. G06F 1/3287
USPC ......................................................... 713/324
See application file for complete search history.

(56) References Cited

U.S. PATENT DOCUMENTS

| | | |
|---|---|---|
| 5,379,382 A | 1/1995 | Work et al. |
| 5,493,684 A | 2/1996 | Gephardt et al. |
| 5,504,910 A | 4/1996 | Wisor et al. |
| 5,511,203 A | 4/1996 | Wisor et al. |
| 5,586,308 A | 12/1996 | Hawkins et al. |
| 5,596,756 A | 1/1997 | O'Brien |
| 5,664,205 A | 9/1997 | O'Brien et al. |
| 5,848,281 A | 12/1998 | Smalley et al. |
| 5,864,702 A | 1/1999 | Walsh et al. |
| 5,870,621 A | 2/1999 | Walsh et al. |
| 5,918,061 A | 6/1999 | Nikjou |

(Continued)

FOREIGN PATENT DOCUMENTS

WO    00/22501    4/2000

OTHER PUBLICATIONS

"Intel.RTM. I/O Controller Hub 10 (ICH10) Family". Oct. 2008. Intel Corporation. Document No. 319973-003.

(Continued)

*Primary Examiner* — Jaweed A Abbaszadeh
*Assistant Examiner* — Cheri Harrington

(57) ABSTRACT

A method of entering a power conservation state comprises selecting and entering one of a plurality of low power states for the computer system in response to a detected system idle event. The plurality of low power states comprise a first low power state and a second low power state for the computer system. A memory of the computer system is self refreshed during the first low power state. A baseband module of the computer system remains powered, and the memory is accessible to the baseband module during the second low power state. The one low power state is selected depending upon baseband module activity. The method also includes exiting from the one of a plurality of low power states when a wake event is detected.

14 Claims, 4 Drawing Sheets

(56) References Cited

U.S. PATENT DOCUMENTS

| | | | |
|---|---|---|---|
| 5,925,133 | A | 7/1999 | Buxton et al. |
| 6,212,645 | B1 | 4/2001 | Tjandrasuwita |
| 6,510,525 | B1 | 1/2003 | Nookala et al. |
| 6,795,781 | B2 | 9/2004 | Aldridge et al. |
| 6,978,362 | B2 | 12/2005 | Muth |
| 7,100,062 | B2 | 8/2006 | Nicholas |
| 7,278,705 | B2 | 10/2007 | Ohara |
| 7,295,827 | B2 | 11/2007 | Liu et al. |
| 7,941,682 | B2 | 5/2011 | Adams |
| 7,966,509 | B2 | 6/2011 | Masson et al. |
| 8,145,928 | B2 | 3/2012 | de Cesare et al. |
| 8,188,851 | B2 | 5/2012 | Haartsen |
| 8,526,604 | B2 | 9/2013 | Batra et al. |
| 8,583,953 | B2 * | 11/2013 | Sultenfuss .................. 713/323 |
| 8,850,252 | B2 | 9/2014 | Doshi et al. |
| 9,104,423 | B2 | 8/2015 | Ahmad et al. |
| 9,222,981 | B2 | 12/2015 | Puvvada et al. |
| 9,474,022 | B2 | 10/2016 | Lin et al. |
| 9,582,065 | B2 | 2/2017 | Kumar et al. |
| 2004/0250147 | A1 | 12/2004 | Chang |
| 2006/0090088 | A1 | 4/2006 | Choi et al. |
| 2007/0005824 | A1 | 1/2007 | Howard |
| 2007/0105600 | A1 * | 5/2007 | Mohanty et al. ............. 455/574 |
| 2008/0005446 | A1 | 1/2008 | Frantz et al. |
| 2008/0168285 | A1 | 7/2008 | de Cesare et al. |
| 2008/0168286 | A1 * | 7/2008 | Tupman ........................ 713/320 |
| 2008/0263318 | A1 | 10/2008 | May et al. |
| 2008/0282101 | A1 * | 11/2008 | Adams ......................... 713/322 |
| 2009/0024799 | A1 * | 1/2009 | Jahagirdar et al. ........... 711/130 |
| 2009/0111524 | A1 | 4/2009 | Basaralu |
| 2009/0204834 | A1 | 8/2009 | Hendin et al. |
| 2009/0256814 | A1 | 10/2009 | Chung et al. |
| 2009/0259861 | A1 | 10/2009 | Tune |
| 2009/0292934 | A1 * | 11/2009 | Esliger .................. G06F 1/3203 <br> 713/323 |
| 2010/0020092 | A1 | 1/2010 | Canu et al. |
| 2010/0067416 | A1 | 3/2010 | Gao et al. |
| 2010/0079508 | A1 | 4/2010 | Hodge et al. |
| 2010/0171753 | A1 | 7/2010 | Kwon |
| 2010/0173651 | A1 * | 7/2010 | Park ...................... H04W 68/02 <br> 455/458 |
| 2011/0161711 | A1 | 6/2011 | Takamoto |
| 2011/0314185 | A1 * | 12/2011 | Conroy et al. .................. 710/22 |
| 2012/0084592 | A1 | 4/2012 | Lin et al. |
| 2012/0096223 | A1 * | 4/2012 | Castelloe .............. G06F 1/3275 <br> 711/118 |
| 2012/0167118 | A1 | 6/2012 | Pingili et al. |
| 2012/0284537 | A1 | 11/2012 | Kruglick |
| 2013/0111242 | A1 | 5/2013 | Heller et al. |
| 2013/0117489 | A1 | 5/2013 | Doshi et al. |
| 2013/0130747 | A1 * | 5/2013 | Appleton .............. G06F 1/3278 <br> 455/567 |
| 2013/0179612 | A1 | 7/2013 | Feekes |
| 2013/0182625 | A1 * | 7/2013 | Kuehnel .......... H04W 52/0274 <br> 370/311 |
| 2013/0198540 | A1 | 8/2013 | Lee et al. |
| 2013/0222323 | A1 | 8/2013 | Mckenzie |
| 2013/0285933 | A1 | 10/2013 | Sim et al. |
| 2013/0290760 | A1 | 10/2013 | Cooper et al. |
| 2013/0311797 | A1 | 11/2013 | Ahmad et al. |
| 2013/0316725 | A1 * | 11/2013 | MacGougan ......... H04W 4/001 <br> 455/456.1 |
| 2014/0003145 | A1 * | 1/2014 | Akers et al. ............. 365/185.08 |
| 2014/0118257 | A1 | 5/2014 | Baldwin |
| 2014/0136411 | A1 * | 5/2014 | Cho et al. ........................ 705/44 |
| 2014/0149754 | A1 | 5/2014 | Silva et al. |
| 2014/0362109 | A1 | 12/2014 | Han et al. |
| 2014/0368423 | A1 | 12/2014 | Brenckle et al. |
| 2015/0237197 | A1 * | 8/2015 | Kuehnel ................ H04M 1/73 <br> 370/311 |

OTHER PUBLICATIONS

"Universal Host Controller Interface (UHCI) Design Guide". Revision 1.1. Mar. 1996; Intel Corporation.

"Low Power Function of Mobile RAM Partial Array Self Refresh (PASR)". Version 1.0. Nov. 2005. Elpida Memory, Inc. Document No. E0697E10.

Stern, Alan. "USB Device Peristence During System Suspend". Online Feb. 25, 2008; (Retrieved from Internet Dec. 3, 2013. http://www.cs.fsu.edu/~baker/devices/lxr/http/source/linux/Documentation/usb/persist.txt>.

"Universal Serial Bus Specification". Revision 2.0. Apr. 27, 2000. Compaq Computer Corporation et al.

Power Management Of US Host Controllers, Microsoft Corporation, Aug. 30, 2004, p. 8.

* cited by examiner

LOW-POWER STATES FOR A COMPUTER SYSTEM WITH INTEGRATED BASEBAND

TECHNICAL FIELD

Embodiments of the present disclosure relate generally to the field of low power states for computer systems and more specifically to the field of power conservation for computer systems with integrated basebands.

BACKGROUND

Computer systems continue to evolve, with ever faster processing speeds, greater data handling capabilities, and increasing storage capacity. Computers have also been steadily reduced in size. This size reduction is most apparent in the laptop, notebook, tablet, and hand-held computer markets (e.g., a smart phone). While desiring to continuously decrease the size and weight of laptops, notebooks, and hand-held computers, manufacturers have also steadily reduced the size and weight of on-board batteries. Because battery-life in laptops, notebooks, and hand-held computers is such an important consideration, power management methods are utilized to increase battery-life.

Conventional computer systems may employ a multitude of power saving features for reducing system power, such as power conservation methods for graphical user interfaces, processors, and memory controllers, which for example, may include frequency reduction, clock-gating, power-gating, low-power DRAM states, low-power I/O modes, and disabling of analog circuits, such as phase-locked loops (PLLs) and delay-locked loops (DLLs). A coordinated engagement and disengagement of these low-power features can enable low-power system states to be utilized for power savings.

However, any level of power-gating of a system component (e.g., a microprocessor, a memory controller) is time constrained based on power mode entry and exit delays. In other words, while deep power savings may be achieved through power-gating, such power-gating may not be permitted if the power-gating entry and exit times exceed prescribed timing constraints. For example, when placing a memory controller into a low-power state, the current state is saved to memory and the memory controller is then transitioned to the low-power state (e.g., the memory controller may be powered off). Later, when a wake-event is received, the memory controller is powered on and its state is restored. However, any resulting latency required to power on the memory controller and restore its previous state must be transparent to any agent requesting memory access. In other words, the deepest power-gating and power saving states may be unreachable because the resulting timing latency is too great.

SUMMARY OF THE INVENTION

Embodiments of this present invention provide solutions to the challenges inherent in managing low power states for computer systems with integrated basebands. In a method according to one embodiment of the present invention, a method for entering a power conservation state is disclosed. The method of entering a power conservation state comprises selecting and entering one of a plurality of low power states for the computer system in response to a detected system idle event. The one low power state is selected depending upon baseband module activity. The plurality of low power states comprise a first low power state and a second low power state for the computer system. A memory of the computer system is self-refreshed during the first low power state. A baseband module of the computer system remains powered, and the memory is accessible to the baseband module during the second low power state. The method also includes exiting from the one of a plurality of low power states when a wake event is detected.

In a computer system according to one embodiment of the present invention, a computer system operable to select and enter a power conservation state is disclosed. The computer system comprises a baseband module, a memory controller, and a processor. The baseband module is operable to process paging events and to process voice calls. The processor and the baseband module are operable to access the memory via the memory controller. The computer system is further operable to enter one of a plurality of low power states in response to a detected system idle event. The one low power state is selected depending upon baseband module activity. The plurality of low power states comprise a first low power state and a second low power state. The memory of the computer system is self refreshed during the first low power state. The baseband module remains powered and the memory is accessible to the baseband module during the second low power state via the memory controller during the second low power state. The computer system is further operable to exit from the one of the plurality of low power states when a wake event is detected.

In a computer system according to another embodiment of the present invention, the computer system comprises a baseband module, a processor, and a memory for storing instructions, that when executed by the computer system perform a method of entering a power conservation state. The method comprises selecting and entering one of a plurality of low power states for the computer system in response to a detected system idle event. The one low power state is selected depending upon baseband module activity. The plurality of low power states comprise a first low power state and a second low power state for the computer system. A memory of the computer system is self refreshed during the first low power state. A baseband module of the computer system remains powered, and the memory is accessible to the baseband module during the second low power state. The method also includes exiting from the one of a plurality of low power states when a wake event is detected.

BRIEF DESCRIPTION OF THE DRAWINGS

Embodiments of the present invention will be better understood from the following detailed description, taken in conjunction with the accompanying drawing figures in which like reference characters designate like elements and in which.

DETAILED DESCRIPTION

Figure 1:
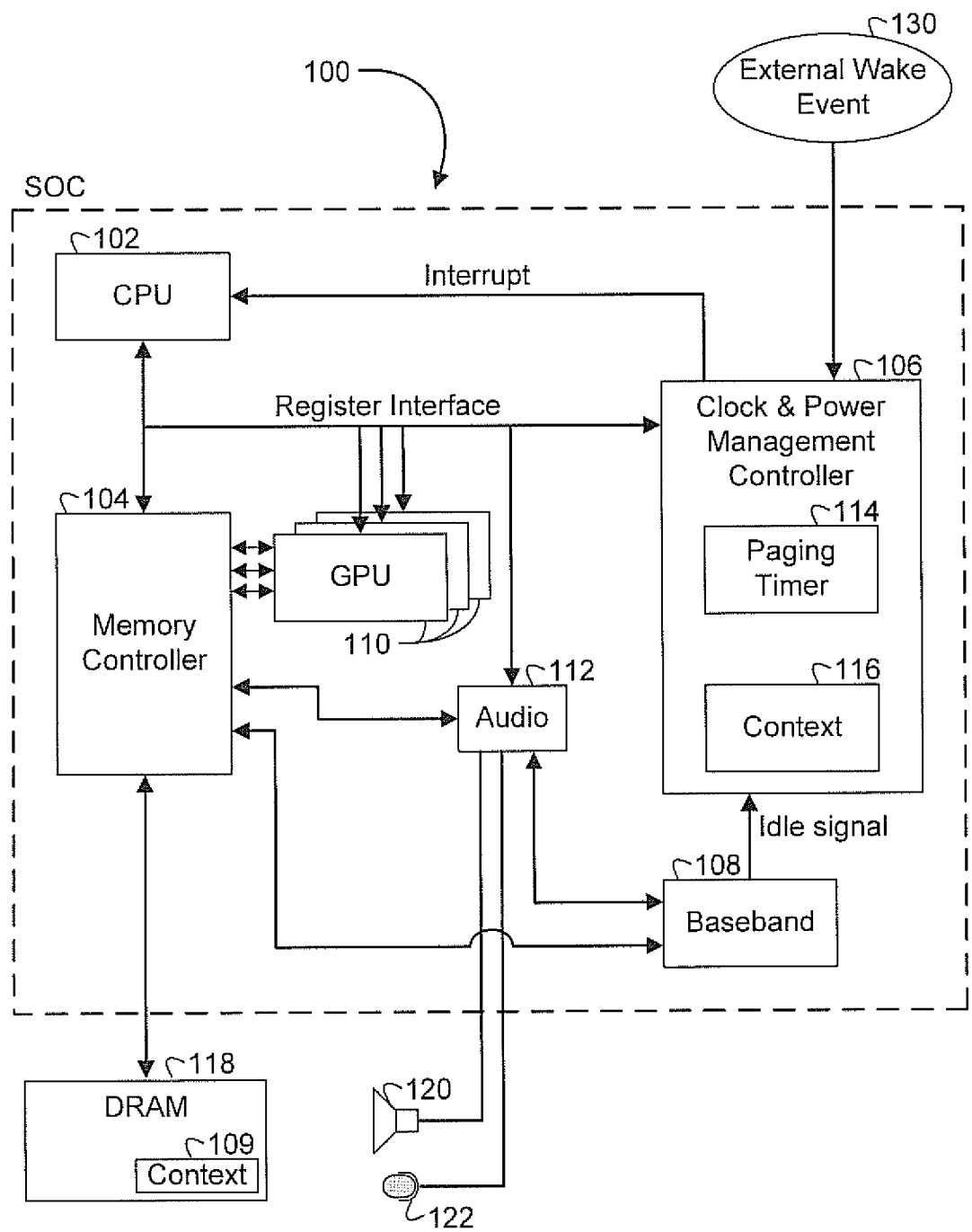
FIG. 1 illustrates an exemplary simplified block diagram of a system on chip with integrated baseband in accordance with an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

Figure 3:
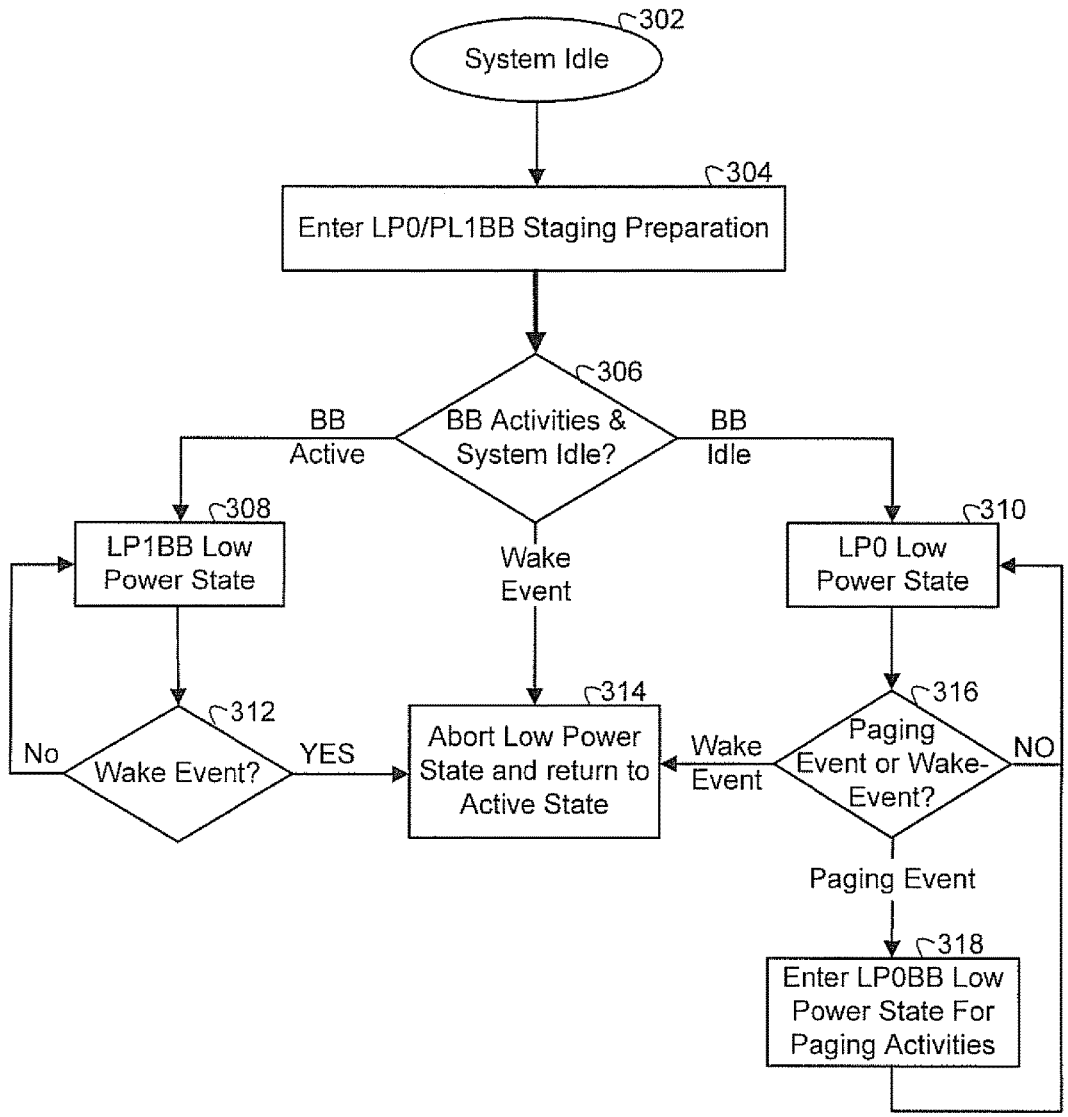
FIG. 3 illustrates an exemplary computer implemented flow diagram for managing low power states for a computer system with an integrated baseband in accordance with an embodiment of the present invention.

Some portions of the detailed descriptions, which follow, are presented in terms of procedures, steps, logic blocks, processing, and other symbolic representations of operations on data bits within a computer memory, e.g., FIG. 3. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Low-Power States for a Computer System with Integrated Baseband:

Embodiments of this disclosure provide solutions to the increasing challenges inherent in managing low power states for a computer system with an integrated baseband. In one embodiment, an exemplary baseband provides all radio functions (e.g., a radio transceiver for accessing cellular and Wi-Fi networks) separately from a system's processor. For example, smart phones, tablets, and other hand-held computer devices may include both a main processor as well as an integrated baseband to handle all wireless functionalities.

Various embodiments of the present disclosure provide for a plurality of low-power states for a computer system with an integrated baseband. In a first low-power state, the computer system is powered down (except for a low-powered, monitoring module, such as the PMC 106) and a memory coupled to the processor is self-refreshed. In a second low-power state, the computer system is powered down except for a memory controller and a baseband module that accesses the memory via the memory controller. As discussed in detail below, while the processor is powered down, the baseband module and the memory may remain powered during the second low-powered state when there is activity at the baseband module. As discussed herein, during the second low-powered state where the baseband remains powered, a memory controller may be re-initialized at a lower frequency when only the baseband is using it (the processor remains powered down). Further, the memory controller will not be arbitrating between the processor and the baseband, so any necessary context for such a low-power state will be different as compared to the context necessary for an active state for the computer system. As discussed herein, the second low-powered state (and the associated contexts for re-initialization) may vary depending on the level of activity in the baseband (e.g., voice calls via a cellular network and/or periodic paging of the cellular network).

FIG. 1 illustrates an exemplary computer system 100, such as a system on chip that may be found in exemplary portable computing devices. The computer system 100 comprises a processor 102 that is coupled to a memory controller 104, a clock and power management controller (PMC) module 106, and at least one graphics processing unit 110. In one exemplary embodiment, the processor 102 may be interconnected with the memory controller 104, PMC module 106, and a graphics processing unit 110 through at least one bus, or other interconnection means. As illustrated in FIG. 1, the computer system 100 may also comprise an audio module 112 and a baseband module 108. The baseband module 108 is also coupled to the PMC module 106, the audio module 112, and the memory controller 104. In one exemplary embodiment, the baseband module 108 manages radio functions for the computer system 100 through exemplary cellular, Wi-Fi, or other wireless networks. In one embodiment, radio functions may include wireless telephone functions. In one embodiment, the audio module 112 is coupled to a speaker 120 and a microphone 122. In one embodiment, the memory controller 104 is coupled to a memory module 118. In one embodiment, as illustrated in FIG. 1, the memory module 118 is external to the computer system 100. As illustrated in FIG. 1, the memory module 118 may be a dynamic random access memory (DRAM) or another suitable memory module.

As discussed herein, the PMC module 106 may comprise a power management controller, a primary System boot-ROM, and a paging timer, either as separate modules or integrated into one or more modules. As illustrated in FIG. 1, the PMC module 106 may comprise a paging timer 114 and a context 116 for re-initializing the memory controller 104 for use by the processor 102 and/or the baseband 108. In one embodiment, the context 116 stored in the PMC module 106 is a minimal context necessary for the re-initializing memory controller 104 to access one or more additional contexts 109 stored in the memory module 118. The one or more additional contexts 109 may be used to re-initialize the processor 102 and/or the baseband 108 by restoring a previously stored state of the computer system 100. For example, before the computer system 100 is placed into a deep-sleep state (LP0), a current state of the computer system 100 is saved as a context 109/116 so that the computer system 100 may be rapidly restored from a low-power state. In one embodiment, a plurality of contexts 109 are stored in the memory module 118 so that the computer system 100 may be re-initialized into either a fully active state, or one of a plurality of additional low-power states where the baseband 108 is powered up and re-initialized but the processor 102 remains unpowered (e.g., LP0BB and LP1BB low-power states).

In one exemplary embodiment, the computer system 100 may be placed into a low-power state when the computer system 100 has been idle or has entered into a reduced activity state. For example, when the computer system 100 is part of an exemplary smart phone, the computer system 100 may be entered into a low-powered state when the smart phone is idle except for baseband activities. As discussed herein, such baseband activities may include periodic paging by the baseband 108 to maintain contact with a cellular network, and handling a voice call when only the baseband 108, memory controller 104, and audio module 112 are active. In one exemplary embodiment, the low-power states allow the computer system 100 to run at a lower power requirement and so conserve and extend a battery life. In one embodiment, low-powered states for baseband activities are power-optimized with minimal re-initialization (e.g., a USB port, GPU 110, processor 102, unnecessary I/O's and other unneeded sub-systems are not needed by the baseband 108 and left unpowered or left in a deep-power down mode).

As described herein, in one embodiment, the context 109 may store a context for a low-power state where the baseband 108 and memory controller 104 remain powered and the memory module 118 is accessible to the baseband 108 through the memory controller 104. As discussed herein, the PMC module 106 may control wake-events and periodic paging (with the paging timer 114) of radio networks by the baseband 108. For example, external wake events 130 may be received by the PMC module 106, resulting in an interruption of any current low-power state.

An Exemplary Discrete Application Processor Paired with an Integrated Baseband:

In one exemplary embodiment, the processor 102 is an application processor (AP) 102 and the baseband 108 is an integrated baseband (BB) module. In one embodiment, the AP and BB modules 102, 108 share memory, audio, and chip-global (e.g. power, clocks) subsystems. In a discrete system (with an external BB module 108 separate from an AP module 102), the AP module 102 may be in a deep-sleep (e.g., low power state LP0) or a light sleep (low power state LP0BB/LP1BB) when the BB module 108 is servicing periodic network paging events or voice calls for which the BB module 108 requires access to memory (DRAM) 118 and other shared chip resources. In the above described low power states for the AP module 102, the AP module 102 is suspended, DRAM 118 is put into self-refresh and sub-systems cannot access the DRAM 118. A main OS (e.g., operating systems for desktop computers, laptops, tablets, and smartphones) may run on the AP module 102, while the BB module 108 may run its own real-time operating system (RTOS). The above described AP module 102 may refer the CPU 102 as well as the rest of the modules of the computer system 100, while excluding the baseband subsystem 108. In other words, the computer system 100 may be referred to as the "application processor."

Low Power State for Integrated Baseband Paging (LP0BB):

From a main OS perspective, a computer system 100, such as a system on chip, may be put into deep sleep (LP0) when the computer system 100 is in an idle state (suspended). For the baseband module 108 to be able to serve periodic paging events (which do not require the processor 102 or the operating system running on the processor 102), the baseband module 108 needs to access the shared DRAM 118, which is not accessible when the computer system 100 is put into the LP0 low-power state. In the LP0 low-power state, most of the system power is off, except for the memory module 118 (which is in a self-refresh mode to retain its state) and the PMC module 106 (powered by an always-on power rail) which monitors system wake-events and optimally sequences system wakeup for a power-efficient re-initialization when wake-events are received.

Exemplary baseband module 108 paging periodicity may range from a fraction of a second to a few seconds in duration, depending upon network type. A full computer system 100 wake (from LP0 to main operating system restore) can take 100's of milliseconds. So waking up the computer system 100 to serve baseband paging will be power inefficient, and can preclude the computer system 100 from ever going into the LP0 state (due to long LP0 entry+exit latencies).

To be able to serve baseband paging events and minimize average wait times for LP0 entry and exit, an LP0 "popup" low power state (referred as LP0BB) may be used. When the system 100 is in an LP0 low-power state and the baseband 108 is ready to perform network paging, the baseband 108 and memory controller 104 may be powered up and re-initialized with a context stored in the always-on, on-die context storage 116 (which is pre-saved at cold boot or saved dynamically prior to each LP0 low-power state entry). As discussed herein, once the on-die context has re-initialized the memory controller 104, the context 109 stored in the memory 118 may be accessed to complete the required re-initialization for the LP0BB low-power state. When the baseband paging event is completed (which may take a few 10 s of milliseconds), the system 100 may then go back to the LP0 low-power state or the system 100 may wake to an active state (if a system wake-event is received during LP0BB). The LP0BB state is invisible to the main OS (in other words, from the perspective of the main OS, the system 100 remains in the LP0 low-power state and wakes up to the active state when a computer system 100 wake-event is received).

As described herein, the memory controller 104 is powered up and re-initialized so that the baseband 108 is able to access the shared DRAM 108 (even as the processor remains powered down). To reduce the LP0 to LP0BB latency and the power and logic requirements for the LP0BB low-power state, a separate secondary memory-controller or a direct path into the memory-controller DRAM-sequencer may be used to access the DRAM during a paging event (which will require a smaller context, thus reducing the LP0 to LP0BB latency, and reducing the power and logic requirements).

The above described LP0BB state may be used for serving baseband module 108 paging events. But the LP0BB state may also be used to serve any other baseband function that requires access to the memory 118, but don't require main operating system services.

Low Power State for Voice Call (LP1BB):

For making an exemplary voice call, the baseband module 108 requires the computer system 100, especially the processor 102 and main OS, to setup the call. But once the call is setup, the baseband module 108 doesn't require the main OS services to continue the call. The baseband module 108 only requires the audio module 112 and memory subsystems (which include the DRAM memory module 118 and the memory controller 104).

If there is no other activity for the computer system 100, then the computer system 100 will be idle after the voice call setup. In such a case, the main OS will be idle after the call setup, and therefore, the computer system 100 may be placed into a "light" sleep (referred to as LP1BB) in which audio 112 and memory subsystems 104, 118 are active, but the rest of the computer system 100 is in a lower power state. From the perspective of the main OS, the computer system 100 will be suspended. The computer system 100 will be woken up when a computer system wake-event (which requires main OS services) is received.

At the completion of the voice call, the baseband 108 requires the main OS to terminate the voice call. So at the voice call completion, the baseband 108 may generate a computer system wake-interrupt which results in the computer system 100 returning to the active state.

The above described LP1BB state may be used for servicing the above described BB module 108 voice calls. But in one exemplary embodiment, the LP1BB state may also be used to serve any other baseband functions which require access to computer system subsystems, but the baseband 108 will terminate that function with a computer system wake-interrupt (so the computer system 100 does not remain in the LP1BB state). For example, as discussed herein, when the baseband is active paging a network when the computer system 100 is entering a low-power state, rather than entering LP0, the computer system 100 may be placed in the LP1BB low-power state.

Individual System Power States and their Entry/Exit:

Active:

In one exemplary embodiment, an active state is a state where the system 100 is running under internal control, and the CPU 102, devices, and system clocks are dynamically scaled, with full functionality available.

LP1BB:

From the perspective of the main OS, during the LP1BB low-power state, the computer system 100 is idle. CPU 102 is power gated, and the CPU rail (extern power source) is powered off. DRAM 118 is NOT in a self-refresh state. AU computer system 100 power-gate-able units are power-gated. Wake events (including interrupts) are possible. Some devices on the computer system 100 may be available. The baseband 108 may be processing network paging events or handling voice calls, hi one exemplary embodiment, the LP1BB low-power state is one state in a continuum of LP1XX low-power states, wherein other LP1XX low-power states may be used for audio cases where BB is not required to be active.

LP0:

The deep sleep LP0 low-power state, which may be entered due to an inactivity timeout, powers down the processor 102 and all other sub-systems in the computer system 100. The system 100 is suspended and the DRAM 118 is in self-refresh. Both the CPU 102 and the system 100 power rails are OFF. Wake events (including USB) are possible. The I/O PADs are powered off except for PADs which monitor wake events.

LP0BB:

As discussed herein, the LP0BB low-power state is entered for periodic network paging by the baseband 108. From the point of view of the main OS running on the processor 102, the system 100 is still in an LP0 low-power state. The memory 118 is accessible to the baseband 108 through the re-initialized memory controller 104. In the LP0BB low-power state, the system 100 rail is ON and the processor 102 rails are OFF. Further, system 100 PG partitions are power-gated, and wake events (including USB) are possible.

Selecting One of Three Low-Power States: LP0, LP0BB, and LP1BB:

The LP0 low-power state is the lowest power saving state. The LP0BB low-power state is a level where network paging by the baseband 108 can take place. The LP1BB low-power state is a level where more baseband 108 functionality may be carried out (such as handling a voice call).

As discussed herein, the main OS detects system idle conditions which trigger the system suspend. The PMC 106 determines whether to enter LP0 or LP1BB (based upon baseband 108 activity). From the perspective of the main OS, the system 100 is suspended. If the baseband 108 is idle, the low-power state selection may proceed to LP0. In one embodiment, if there is paging or imminent paging with the baseband 108, entry into LP0 will be delayed. In one exemplary embodiment, there is a paging-timeout (e.g., an LP0 delay for a paging case may be upper bounded (30 msec) to ensure that the processor isn't keep waiting). After a timeout, the PMC 106 may proceed to LP1BB entry (if the memory 118 is still flagged as required or to be required soon). In another embodiment, after the timeout, the low-power state may be aborted and the system 100 returned to an active state. When a voice call has been received, the system 100 will enter the LP1BB low-power state. As discussed herein, the audio module 112 is also required during voice calls.

LP0 Entry/Exit:

Entry into the LP0 low-power state may happen after a shutdown order has been initiated by the main OS of the computer system 100. As part of the shutdown procedure, most of the external interfaces are placed in idle conditions. The main OS ensures that the I/O PADs that must remain active during the LP0 low-power state are identified. The main OS must also ensure that LP0 wake-up conditions are programmed properly. A wake-up mask and wake-up level should reflect expected wake-up events.

LP0 Entry:

TABLE 1

Steps for LP0 Low-Power State Entry:

1. If voice call go to LP1BB, else continue.
2. Save system clock configurations in DRAM.
3. Set rail voltages to nominal.
4. Flush caches
5. Write out CPU context to DRAM.

TABLE 1-continued

Steps for LP0 Low-Power State Entry:

6. Check if BB is idle or a paging event.
7. Disable memory status (if BB is idle)
8. Put the DRAM into self-refresh mode.
9. Power off the processor rail.

As illustrated in Table 1, when the main OS detects a system idle condition, a system suspend event may be triggered. In a first step, the activities of the baseband module 108 are determined. If there is an active voice call, then LP0 entry is aborted and the LP1BB low-power state will be entered instead, otherwise, entry into LP0 will continue. In a second step, system clock configurations are saved into memory 118. In a third step, system voltages are set to nominal. In a fourth step, processor caches are flushed. In a fifth step, a context 109 is written out for storage in the memory 118. In a sixth step, if the baseband 108 is active, entry into LP0 is delayed. After the delay, if there is a paging-timeout, the LP0 entry is aborted and the LP1BB low-power state will be entered (or the system 100 will return to an active state). In a seventh step, a memory status is disabled. In an eighth step the memory 118 is placed into a self-refresh mode. Finally, in a ninth step, the processor rails are powered off.

LP0 Exit: LP0=>LP0BB, or LP0=>ACTIVE:

The system 100 may awake from the LP0 low-power state when one or more wake-up events trigger. In one embodiment, a wake-up event may be either a change in voltage level or a pulse on one of a set of specified pins, a USB wake condition, or an assertion of an interrupt. A wake-event may also include an interaction by a user causing the computer system 100 to wake. In one embodiment, wake-up logic in the PMC 106 monitors the state of a programmable set of wake-up conditions, and upon detection of wakeup conditions, starts a sequence of actions required for LP0 exit.

LP0 Wake:

TABLE 2

Steps for LP0 Low-Power State Exit:

1. system power request is asserted to PMC.
2. Execution from boot-ROM.
3. Bring DRAM out of self-refresh mode.
4. CPU rail power up.
5. Restore processor context.
6. Main OS/driver restore begins.

As illustrated in Table 2, when a low-power state interrupt has been received, or some other wake-event has been detected, the computer system 100 may execute the steps illustrated in Table 2. In step one, a computer system 100 power request is asserted to the PMC 106. In step two, the system boots from a boot-ROM. In step three, the memory 118 is brought out of a self-refresh mode. In step four, processor 102 power rail(s) are powered up. In step five, processor context is restored (e.g., with the initial context 116 stored in the always-on die storage and the context 109 stored in the memory 118). Finally, in step six, a main OS/driver restore begins.

LP1BB Entry/Exit:

The LP1BB low-power state may be entered when there is no processor 102 activity, and no (or minimal) device activity. In this low-power state, the memory 118 is active, (not put into self-refresh), the processor 102 rail is powered off, and all sub-systems in the computer system 100 are power-gated which may be power-gated. A flow-controller and interrupt controller in the PMC 106 is active. In one exemplary embodiment, the system may enter and exit LP1BB from a secure mode, with the CPU 102 coming out of reset in secure mode.

LP1BB Entry Sequence:

In one exemplary embodiment, after the main OS detects a system idle condition and triggers a system suspend, an entry into the LP1BB low-power state (for an active baseband 108) begins. In a first step, a determination is made as to whether or not the baseband 108 is busy (e.g., with a voice-call or other LP1BB entry conditions). If the baseband 108 is inactive, entry into the LP1BB low-power state will be aborted and the system 100 will be placed into the LP0 low-power state. If the baseband 108 is active, entry into the LP1BB low-power state continues and a context 109 is saved into DRAM 118 (so that upon a return to the active state, the computer system 100 may re-initialize into its previous state). The LP1BB low-power state entry concludes by powering off the processor 102 and other unneeded sub-systems that aren't used during baseband 108 activities, such that the LP1BB low-power state will be energy efficient.

LP1BB Exit Sequence:

When LP1BB wake events are detected, the PMC 106 will begin to power on the processor 102. In one embodiment, a flow detector detects one or more wake events and requests the PMC 106 to power on the processor 102. During a series steps, the processor 102 begins execution from a reset vector, phase lock-loops are enabled, the context 109 in the memory 118 is restored (e.g., the context 109 for re-initialization of the computer system 100 into the active state), and finally, the main OS takes over control of the computer system 100.

Figure 2:
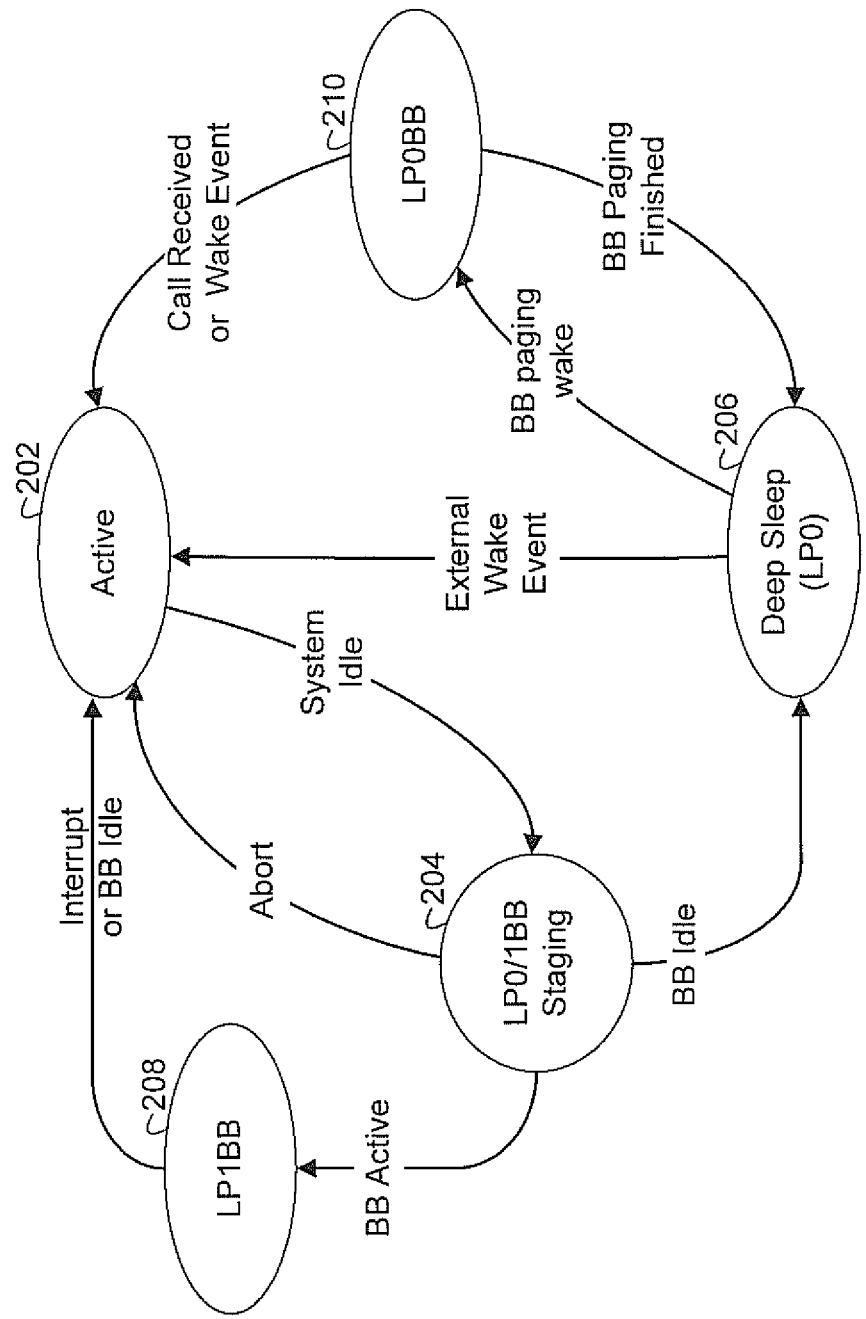
FIG. 2 illustrates an exemplary state diagram for managing low power states for a computer system with an integrated baseband in accordance with an embodiment of the present invention.

Low-Power State Entry/Exit for a Computer System with an Integrated Baseband:

FIG. 2 illustrates an exemplary state diagram illustrating a plurality of possible low-power states for a computer system 100. In an active state 202, the computer system 100 is fully active and all sub-systems are powered. As illustrated in FIG. 2, when a system idle event has been determined, the state will transition from the active state 202 to an LP0/1BB staging state 204. As discussed herein, the LP0/1BB staging state 204 prepares the computer system 100 for entry into one of a deep sleep, low-power state (LP0) or a baseband-active, low-power state (LP1BB), depending on whether the baseband 108 is active (such as during a voice call, an active Wi-Fi connection, or a current network paging event). As discussed herein, the deep sleep, low-power (LP0) state 206 may power down the processor 102 and the computer system 100 power supply rails (to power down other sub-systems), and place the memory module 118 into self-refresh. As discussed herein, only the PMC module 106 remains powered during the LP0 low-power state. As discussed herein, the baseband-active, low-power (LP1BB) state 208 powers off the processor 102 and power-gates all power-gateable sub-systems of the computer system 100 while leaving the baseband 108 and the memory controller 104 powered. The memory module 118 remains powered and accessible to the baseband 108 through the memory controller 104. As also discussed herein, when the memory controller 104 is re-initialized for the LP1BB low-power state, the memory controller 104 is optimally configured for only the baseband 108 (e.g., a lower frequency may be selected and no arbitration logic for handling both the baseband 108 and processor 102 is necessary). If the baseband 108 is active, the state diagram will transition from the LP0/1BB staging state 204 to the LP1BB low-power state 208. But if the baseband 108 is idle, the state diagram will transition from the LP0/1BB staging state 204 to the deep sleep, low-power state (LP0) 206.

As illustrated in FIG. 2, when the computer system 100 is in the LP1BB low-power state 208, and the baseband 108 becomes idle or an interrupt has been received, the computer system 100 will transition from the LP1BB low-power state 208 to the active state 202. In one embodiment, when the baseband 108 becomes idle, the baseband 108 may notify the PMC 106 with an idle signal. As also illustrated in FIG. 2, when the computer system 100 is in the deep sleep, low-power (LP0) state 206, and an external wake event is received, the computer system state will transition back to the active state 202. In one embodiment, a low-power state may be interrupted when other sub-systems in the computer system 100 need to be activated, such as during user interactions (e.g., voice call initiation or end, or when device buttons are depressed).

As also illustrated in FIG. 2, when the computer system 100 is in the deep sleep, low-power (LP0) state 206, and a baseband paging or wake event occurs, the computer system 100 will transition from the LP0 state 206 to a baseband-paging, low-power LP0BB state 210. In the LP0BB state 210, the baseband 108 wakes and performs periodic paging activities. When the periodic paging activities are completed, as illustrated in FIG. 2, the state diagram transitions back to the LP0 state 206. In other words, periodically, the computer system 100 will be awakened from the LP0 state 206 to perform paging duties in the LP0BB state 210 and then return to the LP0 state 206. As also illustrated in FIG. 2, when a voice call is received or another wake-event is initiated while in the LP0BB state 210, the state diagram transitions back to the active state 202. During the subsequent voice call or other baseband activity, the computer system 100 may elect to enter a low-power state and transition to the LP1BB low-power state, as described herein.

FIG. 3 illustrates steps to a computer implemented process for transitioning between different low-power states for a computer system 100, as managed by a PMC module 106. In step 302 of FIG. 3, a system idle event occurs or has been detected. In step 304 of FIG. 3, the computer system 100 will enter LP0/LP1BB staging preparation. As discussed herein, the LP0/LP1BB staging preparation prepares the computer system 100 for entry into one of several low-power states depending on whether a baseband 108 is active. As discussed herein, when there are baseband 108 activities during a system idle period, the computer system 100 may enter the LP1BB state where the baseband 108 remains active and retains access to a memory module 118. If there are no baseband 108 activities, the computer system 100 may be placed into a deeper, low-power state (LP0), and periodically awaken for the baseband 108 to perform network paging, until a wake event is detected or an interrupt is received.

In step 306 of FIG. 3 a determination is made as to whether there are baseband activities during a system idle. If the baseband is active, the process will proceed to step 308 of FIG. 3. In step 308 of FIG. 3, the computer system 100 will enter LP1BB, a low power state where the baseband 108 remains active. If the baseband is idle, the process will proceed to step 310 of FIG. 3. In step 310 of FIG. 3, the computer system 100 will enter LP0, a deep-sleep, low-power state for the entire computer system 100. However, if a wake-event (or interrupt) has been received (the system is no longer idle) during step 306 of FIG. 3, the process will proceed to step 314 of FIG. 3. In step 314 of FIG. 3, the computer system 100 aborts any current low-power state (LP0 or LP1BB) or any preparations to enter a low power state, and return to an active state.

After entering the LP1BB low-power state in step 308 of FIG. 3, the process will proceed to step 312 of FIG. 3. In step 312 of FIG. 3, a determination is made as to whether a wake event (or interrupt) has been received. If a wake event has not been received, the process will transition back to step 308 of FIG. 3 and remain in the LP1BB low-power state. However, if a wake event has been received, the process will transition to step 314 of FIG. 3 and abort the LP1BB low-power state. In other words, the computer system 100 may remain in the LP1BB low-power state of step 308 of FIG. 3 until a wake-event or interrupt has been received or detected.

After entering the LP0 low-power state of step 310 of FIG. 3, the process will proceed to step 316 of FIG. 3. In step 316 of FIG. 3, a determination is made as to whether a paging event or wake-event has been detected. If a wake-event has been received and/or detected, the process will proceed to step 314 of FIG. 3 and abort the LP0 low-power state. If a paging event has been received or detected, the process will proceed to step 318 of FIG. 3. If neither a wake-event nor a paging event has been received or detected, then the process will transition back to step 310 of FIG. 3 and continue in the LP0 low-power state. In other words, the computer system 100 may remain in the LP0 low-power state of step 310 until a wake-event or periodic paging event occurs. In step 318 of FIG. 3, the computer system 100 will enter a baseband active, low-power state (LP0BB) for paging activities. After the paging activities complete, the process will transition back to the low-power, LP0 state, of step 310 of FIG. 3. In one embodiment, as discussed herein, a paging timer in PMC 106 may be used to determine the periodic paging intervals.

Figure 4:
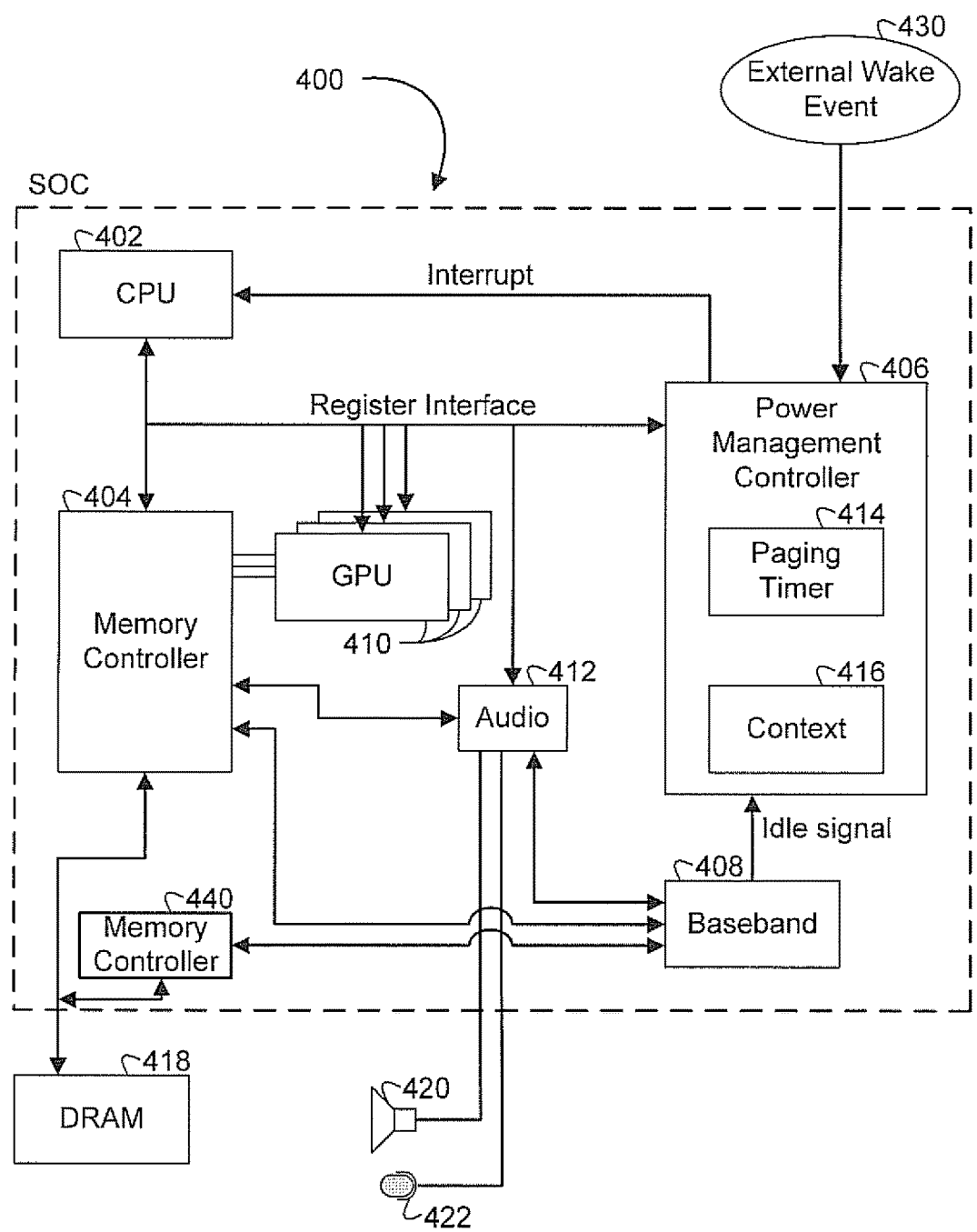
FIG. 4 illustrates an exemplary simplified block diagram of a system on chip with integrated baseband incorporating secondary memory controller in accordance with an embodiment of the present invention.

Alternative Computer System with Integrated Baseband:

FIG. 4 illustrates an exemplary computer system 400 that is similar to the computer system 100 of FIG. 1; however, as discussed herein, computer system 400 comprises a dedicated secondary memory controller 440 that connects a baseband 408 to a memory module 418 during low-power states. As illustrated in FIG. 4, the computer system 400 comprises a processor 402 that is coupled to a memory controller 404, at least one graphics processing unit 410, an audio module 412, and a PMC module 406. FIG. 4 also illustrates a baseband module 408 that is coupled to the PMC module 406, the audio module 412, the memory controller 404, and the secondary memory controller 440. A speaker 420 and microphone 422 are also coupled to the audio module 412.

In one exemplary embodiment, during an active state, the baseband 408 is coupled to the memory module 418 through the memory controller 404. During a low-power state, the baseband 408 may be coupled to the memory module 418 through the secondary memory controller 440. As illustrated in FIG. 4, the secondary memory controller 440 is a dedicated memory controller 440 for the baseband 408 and as such requires less power than the primary memory controller 404. In one exemplary embodiment, the secondary memory controller 440 has been optimized for the baseband 108.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of entering a power conservation state, the method comprising:
   detecting a system idle event of a computer system;
   selecting and entering one of a plurality of low power states for the computer system in response to the detected system idle event, wherein the plurality of low power states comprise:
      a first low power state for the computer system, wherein: a memory of the computer system is self refreshed and an application processor module of the computer system is unpowered during the first low power state;
      a second low power state for the computer system, wherein: during the second low power state, the application processor module is unpowered; a baseband module is active for performing a network paging activity; the memory of the computer system is accessible to the baseband module; and the baseband module accesses the memory through a direct path into a memory sequencer of a memory controller associated with the application processor;
      a third low power state for the computer system, wherein, during the third low power state: the baseband module is active for performing a voice call activity during which the application processor is unpowered; an audio module of the computer system is active; and the memory of the computer system is accessible to the baseband module, and wherein the one of the plurality of low power states is selected depending upon baseband module activity; and
   exiting from the one of the plurality of low power states when a wake event is detected.

2. The method of claim 1 further comprising power gating the computer system during the first low power state.

3. The method of claim 1 further comprising:
   entering the second low power state by exiting from the first low power state when a paging event occurs; and
   returning to the first low power state after the paging event completes.

4. The method of claim 1 wherein the baseband module operates on an operating system separate from an operation system of the application processor.

5. The method of claim 1, wherein during the third low power state, the baseband module is further active for performing activities related to Wi-Fi connection.

6. The method of claim 1; wherein the wake event comprises one of:
   a voice call initiation request;
   a voice call termination request;
   a processor activity request; and
   a detected interaction with the computer system.

7. A computer system comprising:
   a baseband module operable to interact with a network;
   a memory controller operable to access a memory of the computer system; and
   a processor, wherein the baseband module and the processor are operable to access the memory via the memory controller, wherein the computer system is configured to enter one of a plurality of low power states in response to a detected system idle event, wherein the plurality of low power states comprise:
      a first low power state for the computer system, wherein the memory of the computer system is self refreshed and the processor is unpowered during the first low power state; and
      a second low power state for the computer system, wherein: the processor is unpowered; the baseband module is active for performing a network paging activity; and the memory of the computer system is accessible to the baseband module during the second low power state, wherein the one of the plurality of low power states is selected depending upon baseband module activity, wherein the computer system is further operable to: exit from the one of a plurality of low power states when a wake event is detected; and enter the second low power state by exiting from the first low power state when a paging event occurs, and returning to the first low power state after the paging event completes, wherein, during the paging event, the baseband module accesses said memory through a direct path into a memory sequencer of the memory controller.

8. The computer system of claim 7, wherein the baseband module operates on an operating system separate from an operation system of said application processor.

9. The computer system of claim 7, wherein the plurality of low power states further comprise a third low power state, wherein: during the third low power state, the processor module is unpowered; the baseband module is active for performing the voice call activity; an audio module of the computer system is active; and the memory of the computer system is accessible to the baseband module.

10. The computer system of claim 7, wherein during the second low power state, wherein the baseband module operates on an operating system separate from an operation system of the processor.

11. The computer system of claim 7, wherein the wake event comprises one of:
   a voice call initiation request;
   a voice call termination request;
   a processor activity request; and
   a detected interaction with the computer system.

12. A computer system comprising:
   a baseband module;
   a processor; and
   a memory for storing instructions, that when executed by the computer system perform a method of entering a power conservation state, the method comprising:
      detecting a system idle event of a computer system;
      selecting and entering one of a plurality of low power states for the computer system in response to the detected system idle event, wherein the plurality of low power states comprise:
         a first low power state for the computer system, wherein the memory of the computer system is self refreshed and the computer system is power-gated during the first low power state;
         a second low power state for the computer system, wherein: the processor is unpowered; the baseband module is active for a network paging activity; and the memory is accessible to the baseband module during the second low power state, wherein, in said second low power state, the baseband module accesses the memory through a direct path into a memory sequencer of a memory controller associated with the processor; and
         a third low power state for the computer system, wherein, during the third low power state: the processor is unpowered; the baseband module is active for performing a voice call activity; an audio module of the computer system is active; and the memory of the computer system is accessible to the baseband module, and wherein the one of the plurality of low power states is selected depending upon baseband module activity; and exiting from the one of a plurality of low power states when a wake event is detected.

13. The computer system of claim 12, wherein the method further comprises:

entering the second low power state by exiting from the first low power state when a paging event occurs; and returning to the first low power state after the paging event completes.

14. The computer system of claim 12, wherein the baseband module operates on an operating system separate from an operation system of the processor.

\* \* \* \* \*